United States Patent [19]

Sakuma et al.

[11] Patent Number: 5,013,789

[45] Date of Patent: May 7, 1991

[54] PROCESS FOR PRODUCING THERMOPLASTIC RESIN COMPOSITIONS

[75] Inventors: Masato Sakuma; Yuji Fujita; Kissho Kitano; Yukihiko Yagi; Masao Sakaizawa, all of Saitama; Noburo Yamamoto, Tokyo, all of Japan

[73] Assignee: Tonen Sekiyukagaku, Tokyo, Japan

[21] Appl. No.: 285,438

[22] Filed: Dec. 16, 1988

Related U.S. Application Data

[63] Continuation of Ser. No. 143,156, Feb. 1, 1988, abandoned.

[30] Foreign Application Priority Data

Apr. 14, 1986 [JP] Japan .................... 61-8426386

[51] Int. Cl.$^5$ ............................... C08L 77/00
[52] U.S. Cl. ........................ 525/66; 525/179
[58] Field of Search ................... 525/66, 179

[56] References Cited

U.S. PATENT DOCUMENTS 4,404,325 9/1983 Mason et al. .................. 525/179
4,436,872 3/1984 Flood et al. ................... 525/179

FOREIGN PATENT DOCUMENTS 167740 12/1981 Japan .
 74143  4/1984 Japan .
0028539  2/1986 Japan .
2158739  7/1987 Japan .................... 525/179

Primary Examiner—Ana L. Carrillo
Attorney, Agent, or Firm—W. G. Muller

[57] ABSTRACT

A process for producing a thermoplastic resin composition which comprises preparing a component composed of 1 to 49 parts by weight of modified polyolefin (A) obtained by adding an unsaturated carboxylic acid or a derivative thereof to a polyolefin, 1 to 98 parts by weight of polyolefin (B), and 1 to 98 parts by weight of polyamide (C) [provided that (A)+(B)+(C)=100 parts by weight], mixing the component or its molten component with a metal compound (D) in an amount of 0.5 to 5 times the molar quantity of the acid added to the modified polyolefin (A), and subsequently melt-mixing the mixture. The thermoplastic resin composition prepared by this process is preferably used for providing products improved in both surface luster and mechanical strengths.

3 Claims, No Drawings

PROCESS FOR PRODUCING THERMOPLASTIC RESIN COMPOSITIONS

This is a continuation of application Ser. No. 143,156, filed 2/1/88 now abandoned.

TECHNICAL FIELD

This invention relates to a process for producing a thermoplastic resin composition which can provide products improved in both surface luster and mechanical strengths.

BACKGROUND ART

Attempts have been made to obtain a blended resin composition having the characteristic properties of both polyolefin and polyamide for the purpose of improving the mechanical properties, heat resistance, and dyeability of polyolefin, and reducing the water absorption of polyamide, and thereby avoiding the deterioration of physical properties of polyamide caused by water absorption. This object is not achieved by merely blending polypropylene and polyamide by melt-mixing. Mere blending provides a mixture which is subject to phase separation and is poor in surface gloss and mechanical strength, because polypropylene and polyamide mix poorly. A known way to improve their compatibility is to partly or entirely modify a polyolefin with an unsaturated carboxylic acid anhydride. In addition, there is proposed a composition containing a modified polyolefin to which metal atoms are attached. (Japanese Patent Laid-open Nos. 167740/1981 and 74143/1984)

The modified polyolefin to which metal atoms are attached is improved in compatibility to some extent but is not sufficiently improved in mechanical strength, because it is formed by reacting an acid-modified polyolefin with a metal compound.

DISCLOSURE OF THE INVENTION

It is an object of this invention to provide a process for producing a composition which is free of the problems involved in the conventional compositions. The composition of the invention has improved the compatibility of polyolefin and polyamide, and also has improved mechanical strength and surface characteristics.

To eliminate the drawbacks of the conventional compositions, the inventors carried out much research, and found that the above object is achieved by melt-mixing a metal compound with an acid-modified polyolefin, polyolefin, and polyamide. The melt-mixing may be performed on all the four components at one time or by adding a metal compound to a previously melt-mixed composition of the last three components. This invention is based on these discoveries.

Accordingly, the gist of the invention is a process for producing a thermoplastic resin composition which comprises preparing a component composed of 1 to 49 parts by weight of modified polyolefin (A) obtained by adding an unsaturated carboxylic acid or a derivative thereof to a polyolefin, 1 to 98 parts by weight of polyolefin (B), and 1 to 98 parts by weight of polyamide (C) [provided that (A)+(B)+(C)=100 parts by weight]; mixing the component or its molten component with a metal compound (D) in an amount of 0.5 to 5 times the molar quantity of the acid added to the modified polyolefin (A), and subsequently melt-mixing the mixture.

The polyolefin used for the modified polyolefin in the present invention is a homopolymer of ethylene or propylene, a homopolymer of α-olefin such as butene-1, pentene-1, hexene-1, and 4-methylpentene-1, a copolymer of ethylene and α-olefin, or a copolymer of two or more of these α-olefins. It is a crystalline polymer. The copolymer includes random copolymers and block copolymers. These polymers may be used in combination with one another. Among the above-mentioned polyolefins, polypropylene and propylene-based polymers (such as propylene-α-olefin random or block copolymers) are preferable from the standpoint of heat resistance and stiffness.

The modified polyolefin (A) in this invention is one which is formed by grafting a polyolefin with an unsaturated carboxylic acid or a derivative thereof in an amount of 0.001-10 wt %, preferably 0.05-5 wt %. Examples of the unsaturated carboxylic acid and derivative thereof include acrylic acid, maleic acid, fumaric acid, tetrahydrophthalic acid, itaconic acid, citraconic acid, crotonic acid, isocrotonic acid, endo-bicyclo[2.2.1]-5-heptene-2,3-dicarboxylic acid, acid anhydrides thereof, and esters thereof.

The grafting of a polyolefin with an unsaturated carboxylic acid or a derivative thereof may be accomplished by any known method. According to a preferred method, a polyolefin is melt-mixed with an unsaturated carboxylic acid or a derivative thereof and an organic peroxide (such as di-t-butyl peroxide and 2,5-dimethyl-2,5-di(t-butylperoxy)-hexyne-3) as a reaction initiator. According to another preferred method, a polyolefin is dissolved in a solvent and a unsaturated carboxylic acid or a derivative thereof and a reaction initiator are added to the solution for reaction.

The polyolefin (B) in the present invention is the same polyolefin as that used for the above-mentioned modified polyolefin (A).

The polyamide (C) in the present invention is a polymeric compound having the acid amide (—CONH—) as the repeating unit. It is classified, according to the type of polymerization, into (1) one which is formed by ring-opening polymerization of lactam, (2) one which is formed by polycondensation of aminocarboxylic acid, and (3) one which is formed by polycondensation of diamine and dibasic acid. They are called nylon by the generic name, and they include nylon-6, nylon-12, nylon-9, nylon-11, nylon-66, and nylon 610. Among them are preferably nylon-6 and nylon-66. The polyamide is not specifically limited in molecular weight; but the preferred molecular weight is one which corresponds to a relative viscosity ($\eta_{rel}$) higher than 0.5, preferably higher than 2.0.

The metal compound (D) in the present invention is a hydroxide, carboxylate, or oxide of a metal belonging to Groups I, II, and III of the Periodic Table. Examples of such a metal include lithium, sodium, potassium, cesium, magnesium, barium, zinc, and aluminum. Preferable among them are sodium compounds and zinc compounds.

The composition of the present invention may be prepared by either of the following two methods:
(1) A modified polyolefin (A), a polyolefin (B), a polyamide (C), and a metal compound (D) are mixed all at once by melt-mixing.
(2) A modified polyolefin (A), a polyolefin (B), and a polyamide (C) are mixed by melt-mixing, and to the resulting mixture is added a metal compound (D) by further melt-mixing.

The compounds are mixed in the following mixing ratios. The amount of the modified polyolefin (A) is 1 to 49 parts by weight, preferably 5 to 40 parts by weight; the amount of the polyolefin (B) is 1 to 98 parts by weight, preferably 10 to 90 parts by weight; the amount of the polyamide (C) is 1 to 98 parts by weight, preferably 10 to 90 parts by weight (provided that (A)+(B)+(C)=100 parts by weight); and the amount of the metal compound (D) is 0.5 to 5 times, preferably equal to, the molar quantity of the acid added to the modified polyolefin (A). With a modified polyolefin (A) of less than 1 part by weight, the resulting composition is not improved in miscibility by the bonding with the metal compound. Conversely, with a modified polyolefin (A) in excess of 49 parts by weight, the resulting composition is poor in physical properties and melt-flowability due to excessive crosslinking reaction. With a polyolefin (B) of less than 1 part by weight, the resulting composition is not improved in moisture resistance and chemical resistance by the polyolefin. Conversely, with a polyolefin (B) in excess of 98 parts by weight, the resulting composition is not improved in mechanical properties, heat resistance, and barrier properties by polyamide (C). With a metal compound (D) less than 0.5 times in molar quantity, the resulting composition is not improved in compatibility by the bonding to the acid attached to a modified polyolefin (A). Conversely, with a metal compound (D) in excess of 5 times in molar quantity, the resulting composition has no effect by the reaction with the acid attached. An excess metal compound (D) is not only uneconomical but also detrimental to the physical properties of the resulting composition.

The melt-mixing may be accomplished by previously dry-blending the components using a Henschel mixer, ribbon blender, or the like and then mixing the mixture in a Banbury mixer, roll mill, extruder, or the like, at a temperature (usually 170°–300° C., preferably 200°–250° C.) at which the resins melt, for 1–10 minutes, preferably 3–5 minutes. After melt-mixing the composition is palletized or crushed.

The composition of the invention may be incorporated with a heat stabilizer, UV light absorber, nucleating agent, antistatic agent, slip agent, flame retardant, coloring agent, inorganic filler, plasticizer, and the like, in amounts not detrimental to the object of the invention.

During melt-mixing, the acid group in the acid-modified polyolefin reacts with the metal in the metal compound to form the network structure through ionic crosslinking. The network structure embraces the polyolefin and polyamide. This structure improves the miscibility of the polyolefin and polyamide in the composition, thereby improving the surface gloss and mechanical properties of the composition.

THE BEST MODES FOR CARRYING OUT THE INVENTION

Examples

The invention will now be described in more detail by reference to the following examples, in which parts and percent are based on weight. The test methods used in the examples are as follows:
(1) MFR: JIS K7210 (load 2.16 kg, 230° C.)
(2) Tensile strength and Tensile elongation at break: ASTM D638
(3) Flexural modulus: ASTM D790
(4) Izod impact strength: ASTM D256 (at 23° C., with notch)
(5) Surface gloss; ASTM D523 (60°)

Materials used

Preparation of modified polypropylene (1) 100 parts of crystalline propylene-ethylene block copolymer (FMR=1.0 g/10 min, ethylene content=7.0%), 1.0 part of endobicyclo-[2.2.1]-5-heptene-2,3-dicarboxylic anhydride (referred to as HA acid hereinafter), and 0.3 parts of 2,5-dimethyl-2,5-di-(t-butylperoxy)-hexyne-3 as a reaction initiator were dry-blended. The resulting mixture was fed to a vented single-screw extruder, with the cylinder temperature set at 225° C., for melt-mixing. Thus there was obtained a modified propylene-ethylene block copolymer (referred to as CMPP-1 hereinafter). The amount of the acid added was 0.4%.

(2) A modified homopolypropylene (referred to as CMPP-2 hereinafter) was prepared in the same manner as for CMPP-1 except that the block copolymer was replaced by crystalline homopolypropylene (MFR=1.0 g/10 min). The amount of the acid added was 0.3%.

(3) A modified propylene-ethylene block copolymer (referred to as CMPP-3 hereinafter) was prepared in the same manner as for CMPP-1 except that maleic anhydride (referred to as MA acid hereinafter) was used as the acid modifier. The amount of the acid added was 0.35%.

(4) A modified propylene-ethylene random copolymer (referred to as CMPP-4 hereinafter) was prepared in the same manner as for CMPP-1 except that the crystalline propylene-ethylene block copolymer was replaced by a crystalline propylene-ethylene random copolymer (MFR=3.0 g/10 min, ethylene content=3%). The amount of the acid added was 0.42%.

Crystalline Polypropylene (1) Homopolypropylene (MFR=1.0 g/10 min, referred to as PP-1 hereinafter)
(2) Homopolypropylene (MFR=15.0 g/10 min, referred to as PP-2 hereinafter)
(3) Homopolypropylene (MFR=40.0 g/10 min, referred to as PP-3 hereinafter)
(4) Propylene-ethylene block copolymer (MFR=1.0 g/10 min, ethylene content=7%, referred to as PP-4 hereinafter)
(5) Propylene-ethylene block copolymer (MFR=40.0 g/10 min, ethylene content=7%, referred to as PP-5 hereinafter)

Nylon (1) Nylon-6 (relative viscosity=2.6, A-1030BRL (a product of Unitika Ltd.), referred to as NY-1)
(2) Nylon-6 (relative viscosity=3.4, A-1030BRT (a product of Unitika Ltd.), referred to as NY-2)
(3) Nylon-66 (Malanyl A-125 (a product of Unitika Ltd.), referred to as NY-3)

Metal Compound (1) Zinc acetate [$Zn(OAc)_2$]
(2) Sodium hydroxide (NaOH)

Examples 1 to 14 and Comparative Examples 1 to 7

(1) Simultaneous blending
Pellets of crystalline PP, modified PP, nylon, and a metal compound were dry-blended, and the resulting mixture was melt-mixed using a twin-screw mixer at 250° C. Thus there was obtained a uniform composition.

(2) After blending

Pellets of crystalline PP, modified PP, and nylon were dry-blended, and the resulting mixture was melt-mixed using a twin-screw mixer at 250° C. To the mixture was introduced a metal compound through the barrel of the twin-screw mixture at 250° C., and mixing was continued. Thus there was obtained a uniform composition.

The compositions prepared by the above-mentioned methods were made into test pieces by injection molding at a molding temperature of 230° C. and a mold temperature of 50° C. The test pieces were examined for physical properties. The results are shown in Table 1.

Therefore, the composition has improved surface gloss and mechanical strength. In addition, the composition of the invention is also improved in its ability to be painted and its adhesion.

Because of the above-mentioned characteristic properties, a composition prepared according to the process of the invention is suitable for an industrial material, especially for use for automobiles and household electric appliance.

We claim:

1. A process for producing a thermoplastic resin composition which comprises preparing a component consisting essentially of 1 to 49 parts by weight of a modified polypropylene or polypropylene-based polymer (A) obtained by adding an unsaturated carboxylic acid

TABLE 1

| Example No. | 1 | 2 | 3 | 4 | 5 | 6 | 7 |
|---|---|---|---|---|---|---|---|
| Modified PP | CMPP-1 | CMPP-2 | CMPP-3 | CMPP-4 | CMPP-1 | CMPP-1 | CMPP-1 |
| (parts) | 14 | 14 | 14 | 14 | 7 | 7 | 7 |
| PP | PP-1 | PP-3 | PP-1 | PP-3 | PP-1 | PP-1 | PP-1 |
| (parts) | 56 | 56 | 56 | 56 | 10 | 63 | 83 |
| Nylon | NY-1 | NY-1 | NY-1 | NY-1 | NY-1 | NY-1 | NY-1 |
| (parts) | 30 | 30 | 30 | 30 | 83 | 30 | 10 |
| Metal compound | $Zn(OAc)_2$ | $Zn(OAc)_2$ | $Zn(OAc)_2$ | $Zn(OAc)_2$ | $Zn(OAc)_2$ | $Zn(OAc)_2$ | $Zn(OAc)_2$ |
| (parts) | 0.05 | 0.05 | 0.05 | 0.05 | 0.025 | 0.025 | 0.025 |
| Ratio to acid | equimolar | equimolar | equimolar | equimolar | equimolar | equimolar | equimolar |
| Blending method | simul. | simul. | simul. | simul. | simul. | simul. | simul. |
| Tensile strength (kg/cm$^2$) | 560 | 570 | 560 | 580 | 760 | 550 | 520 |
| Elongation at break (%) | 18.0 | 17.5 | 18.0 | 17.9 | 22.0 | 12 | 11 |
| Flexural modulus (kg/cm$^2$) | 19000 | 19200 | 19000 | 19100 | 24000 | 19300 | 16800 |
| Izod impact strength (kg-cm/cm) | 6.1 | 5.9 | 6.1 | 6.1 | 6.5 | 5.4 | 5.2 |
| Surface gloss (%) | 77 | 77 | 76 | 77 | 80 | 75 | 74 |

| Example No. | 8 | 9 | 10 | 11 | 12 | 13 | 14 |
|---|---|---|---|---|---|---|---|
| Modified PP | CMPP-1 | CMPP-1 | CMPP-1 | CMPP-1 | CMPP-1 | CMPP-1 | CMPP-1 |
| (parts) | 14 | 14 | 14 | 14 | 14 | 14 | 14 |
| PP | PP-1 | PP-1 | PP-1 | PP-1 | PP-1 | PP-1 | PP-1 |
| (parts) | 56 | 56 | 56 | 56 | 56 | 76 | 10 |
| Nylon | NY-1 | NY-1 | NY-1 | NY-2 | NY-3 | NY-3 | NY-3 |
| (parts) | 30 | 30 | 30 | 30 | 30 | 10 | 76 |
| Metal compound | $Zn(OAc)_2$ | NaOH | $Zn(OAc)_2$ | $Zn(OAc)_2$ | $Zn(OAc)_2$ | $Zn(OAc)_2$ | $Zn(OAc)_2$ |
| (parts) | 0.24 | 0.022 | 0.05 | 0.05 | 0.05 | 0.05 | 0.05 |
| Ratio to acid | 5 mol | equimolar | equimolar | equimolar | equimolar | equimolar | equimolar |
| Blending method | simul. | simul. | after | simul. | simul. | simul. | simul. |
| Tensile strength (kg/cm$^2$) | 550 | 570 | 560 | 580 | 590 | 530 | 710 |
| Elongation at break (%) | 15 | 17 | 17.9 | 22.0 | 17.3 | 11.0 | 11.0 |
| Flexural modulus (kg/cm$^2$) | 19600 | 19100 | 19100 | 19200 | 19900 | 17200 | 23000 |
| Izod impact strength (kg-cm/cm) | 5.9 | 5.9 | 6.0 | 6.0 | 6.1 | 5.1 | 6.7 |
| Surface gloss (%) | 75 | 77 | 76 | 70 | 86.1 | 80 | 85 |

| Comparative Example No. | 1 | 2 | 3 | 4 | 5 | 6 | 7 |
|---|---|---|---|---|---|---|---|
| Modified PP | CMPP-1 | CMPP-1 | CMPP-1 | CMPP-1 | CMPP-1 | CMPP-1 | CMPP-1 |
| (parts) | 14 | 7 | 14 | 7 | 14 | 14 | 14 |
| PP | PP-1 | PP-1 | PP-1 | PP-1 | PP-1 | PP-1 | PP-1 |
| (parts) | 56 | 10 | 56 | 10 | 56 | 56 | 76 |
| Nylon | NY-1 | NY-1 | NY-1 | NY-1 | NY-3 | NY-3 | NY-3 |
| (parts) | 30 | 83 | 30 | 83 | 30 | 30 | 10 |
| Metal compound | $Zn(OAc)_2$ | $Zn(OAc)_2$ | — | — | — | $Zn(OAc)_2$ | $Zn(OAc)_2$ |
| (parts) | 0.05 | 0.025 | — | — | — | 0.05 | 0.05 |
| Ratio to acid | equimolar | equimolar | — | — | — | equimolar | equimolar |
| Blending method | before | before | — | — | — | before | before |
| Tensile strength (kg/cm$^2$) | 460 | 640 | 420 | 600 | 490 | 500 | 450 |
| Elongation at break (%) | 16 | 21 | 18 | 21 | 16.1 | 16.5 | 12.0 |
| Flexural modulus (kg/cm$^2$) | 19000 | 25000 | 19000 | 24000 | 19300 | 19500 | 17400 |
| Izod impact strength (kg-cm/cm) | 4.5 | 5.3 | 4.0 | 4.9 | 5.0 | 5.2 | 4.2 |
| Surface gloss (%) | 70 | 73 | 62 | 65 | 76 | 79 | 70 |

Industrial Uses of the Invention

The composition prepared according to the process of the invention improves the compatibility of polyolefin and polyamide and improves their uniformity over conventional compositions prepared from a modified polyolefin to which metal atoms are previously bonded.

or a derivative thereof to a first crystalline polypropylene or polypropylene-based polymer, 1 to 98 parts by weight of a second crystalline polypropylene or polypropylene-based polymer (b), and 1 to 98 parts by weight of a polyamide (C), provided that (A)+(B)+(C)=100 parts by weight; mixing the component or the molten component with at least one metal compound (D) selected from the group consisting of hydroxides, carboxylates and oxides of a metal from Group I, II or III of the Periodic Table in an amount of 0.5 to 5 times the molar quantity of the acid added to the modified polyolefin (A), and subsequently melt-mixing the mixture.

2. A thermoplastic resin composition consisting essentially of 1 to 49 parts by weight of a modified polypropylene or polypropylene-based polymer (A) obtained by adding an unsaturated carboxylic acid or a derivative thereof to a first crystalline polypropylene or polypropylene-based polymer, 1 to 98 parts by weight of a second crystalline polypropylene or polypropylene-based polymer (B), 1 to 98 parts by weight of a polyamide (C), provided that (A)+(B)+(C)=100 parts by weight, and a metal compound (D) selected form the group consisting of hydroxides, carboxylates and oxides of a metal from Group I, II or III of the Periodic Table in an amount of 0.5 to 5 times the molar quantity of the acid added to the modified polyolefin (A).

3. The composition according to claim 2 wherein said polypropylene-based polymer contains not more than about 7 wt. % ethylene.

* * * * *